United States Patent [19]

Childress

[11] 4,176,023
[45] Nov. 27, 1979

[54] DELSALINIZATION AND CHEMICAL EXTRACTION PROCESS

[75] Inventor: Donnie D. Childress, Braggs, Okla.

[73] Assignee: Desal-Chem, Inc., Tulsa, Okla.

[21] Appl. No.: 948,668

[22] Filed: Oct. 5, 1978

[51] Int. Cl.² .......................... C25B 1/28; C25B 1/20; B01D 3/10; C25B 1/02
[52] U.S. Cl. ..................................... 204/98; 204/128; 204/129; 204/100; 203/11
[58] Field of Search ................ 204/98, 128, 129, 100; 203/11

[56] References Cited

U.S. PATENT DOCUMENTS 4,115,218  9/1978  Krumpelt .............................. 204/98

*Primary Examiner*—R. L. Andrews
*Attorney, Agent, or Firm*—William S. Dorman

[57] ABSTRACT

A combined desalinization and extraction process for brinewater having a salinity of 7½% to 9%. The brinewater is introduced to a concentrator basically similar to a shell-and-tube type heat exchanger vertically arranged with upper and lower chambers above and below the tube section and communicating with each other through the tubes. A heating element in the lower chamber causes the brinewater to be heated until it reaches its boiling temperature. Vapors are removed from the upper chamber and are externally compressed so as to create a partial vacuum in the upper chamber. The compressed vapors are passed from the compressor to the concentrator into the spaces on the outside of the tubes where the vapors are condensed as liquid water. The condensed fresh water on the outside of the tubes is removed. The remaining brinewater within the tubes, which is concentrated at 28% salinity, is conducted to a plurality of electrolytic cells having positively charged anodes and negatively charged cathodes. The concentrated brine is electrolyzed with low voltage direct current to release chlorine gas, caustic alkali containing primarily sodium hydroxide, hydrogen gas, and an inert material containing calcium, nitrogen, and m agnesium oxide. The chlorine gas is conducted to a mist extractor separator to remove any impurities and then compressed to form liquid chlorine. The hydrogen gas is conducted to a mist extraction separator to remove any impurities.

3 Claims, 3 Drawing Figures

[4,176,023]

DESALINIZATION AND CHEMICAL EXTRACTION PROCESS

BACKGROUND OF THE INVENTION

1. Field of the Invention

This invention relates to the treatment of brines, such as underground brinewater or seawater, to desalinize the brine and to extract various chemicals, gases, and metals therefrom in a combined process.

2. Description of the Prior Art

Various methods and processes of desalinizing underground brine aquifers or seawater are well-known. The distillation process, the vapor compression process, and the reverse osmosis process are among those currently in use.

Likewise, chemical recovery using electrolysis is well-known and widely used. There is a need, however, to improve the efficiency of these units to make them more economical.

Brinewater that is removed from the earth during oil well production is presently little used. Frequently, the brinewater is put back in the ground by being injected into underground disposal wells. Over time, this salt water may leach into the fresh water. The Environmental Protection Agency, among others, has objected. A chemical recovery plant operated efficiently in series with a a desalinization plant would have several advantages.

Therefore, it is a principal object and purpose of this invention to provide a combined desalinization and chemical extraction process that would operate efficiently and produce pure products. It is a further object and purpose of the present invention to provide a process designed to be simple in operation and that could be constructed so as to be mobile.

SUMMARY OF THE INVENTION

The present invention provides a combined saltwater desalinization process and electrical extraction process for use on brinewater that is commonly removed from the earth during oil well production. The brinewater is continuously introduced into a brine concentrator having a series of intercommunicating tubes therein. The brinewater is heated to its boiling point and then passed through the tubes. The vapors from the boiling brine within the tubes are compressed mechanically, thereby creating a vacuum. The vapors are forced to sufficiently high pressure to give a steam temperature high enough to allow condensation in the space on the outside of the tubes.

The brinewater is thus separated into two parts. Approximately 75% of the brinewater is discharged as fresh water and the remaining 25% solution is then concentrated at 28% salinity.

The concentrated brine solution, which is at an ideal salinity for efficient electrolysis, is continuously pumped to a series of electrolytic cells. Low voltage direct current is supplied to the cells. The concentrated solution is continuously introduced into the anode compartments of the cells where gaseous chlorine is evolved at the electrodes and metal oxides are liberated at the cathodes. The electrolysis process produces chlorine as a gas, small amounts of hydrogen gas, a caustic alkali composed mainly of sodium hydroxide, and a powdery material composed mainly of calcium, nitrogen, and magnesium oxide.

Chlorine gas is passed to a mist extractor separator to remove the impurities. The chlorine gases are then pumped to a compressor where it is changed to liquid chlorine and finally is passed to a storage tank.

Likewise, the hydrogen gas produced during electrolysis is pumped to a separator to remove any impurities, and, under certain circumstances, it may be possible to liquify and store it.

DETAILED DESCRIPTION OF THE PREFERRED EMBODIMENTS

Figure 1:
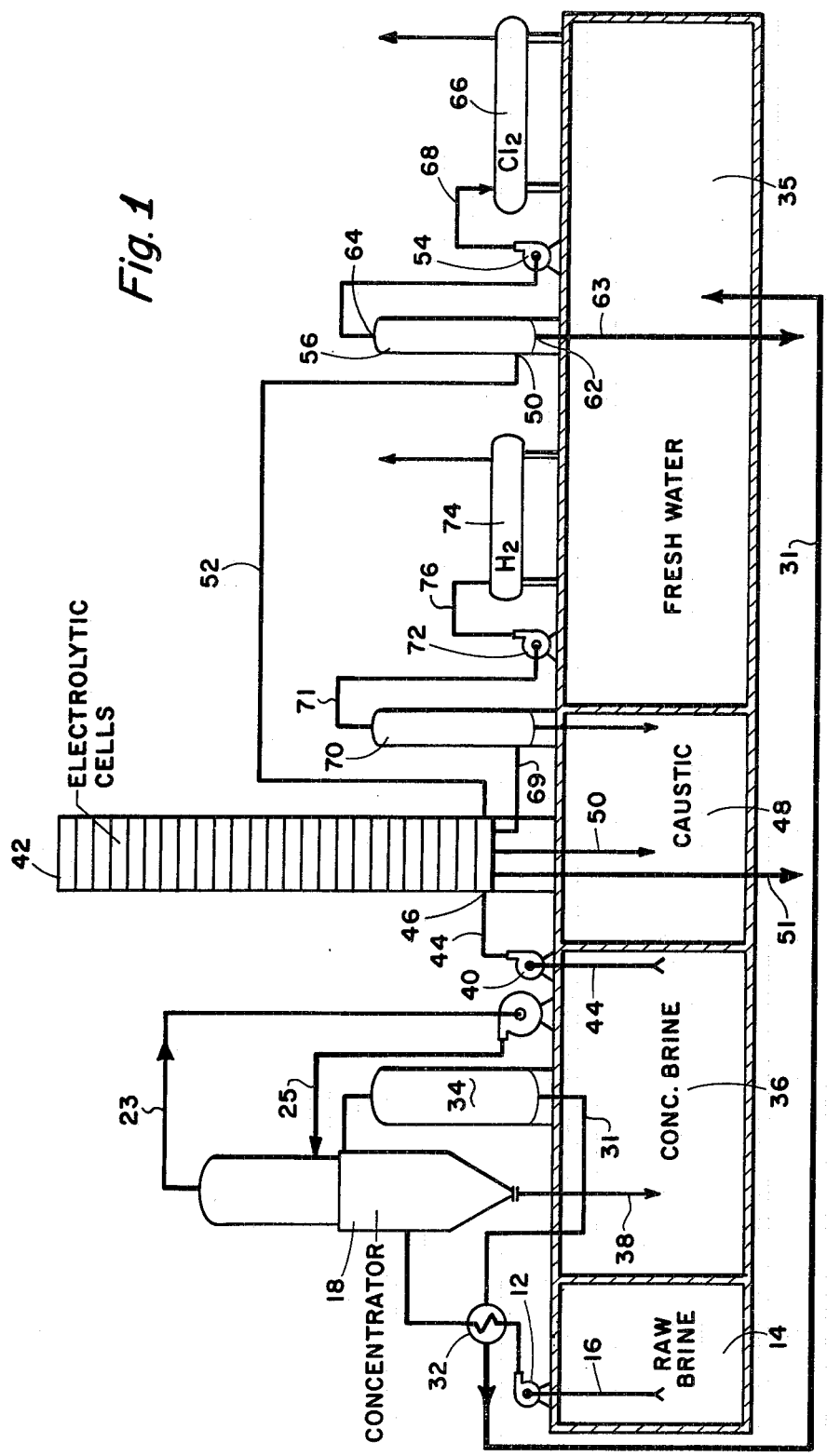
FIG. 1 is a diagrammatic flow-chart of desalinization and chemical extraction process constructed in accordance with one embodiment of the present invention.

Referring to the drawings in detail, the present invention provides a novel combined saltwater desalinization and chemical extraction process, as seen in the flow-chart diagram in FIG. 1.

Brinewater, consisting of water ($H_2O$), sodium chloride (NaCl), and various other chemicals, and having a salinity of $7\frac{1}{2}\%$ to 9%, may be found in underground aquifers throughout the world. This saltwater has approximately four times more salinity than seawater. It is commonly removed from the earth during oil well production. Historically, the brinewater has been brought to a storage facility for subsequent disposal by being injected into underground disposal wells.

In the present invention, a feed pump 12 pulls the brinewater (not shown in FIG. 1) from a storage facility 14 through a conduit 16. Brinewater is then continuously introduced into a brine concentrator 18 through the conduit 16.

Figure 2:
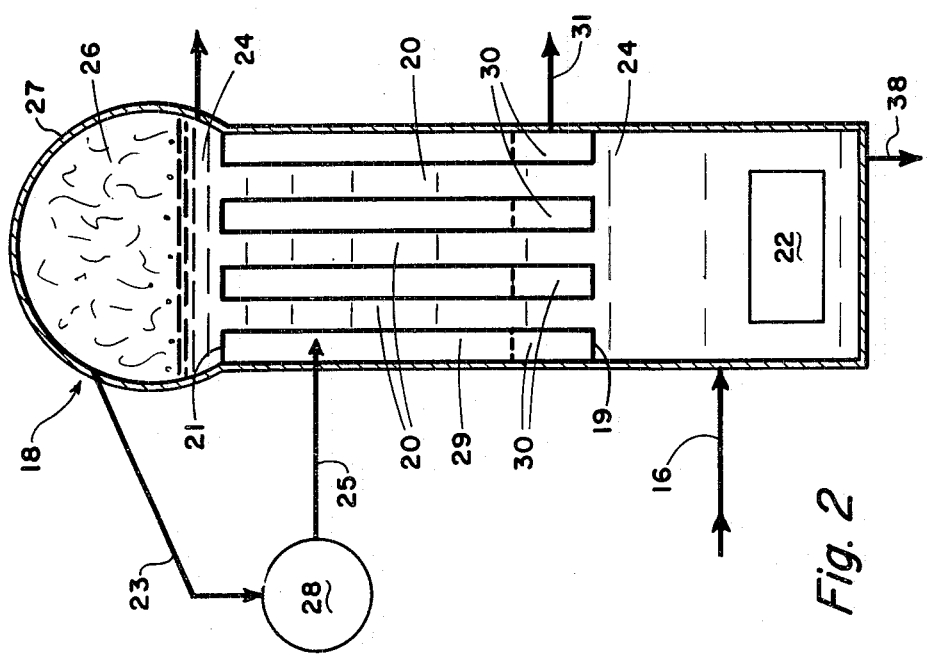
FIG. 2 is a diagrammatic section view of a brine concentrator that would be utilized as a part of the desalinization and chemical extraction process shown in FIG. 1.

The brine concentrator 18 contains a series of intercommunicating tubes 20 connected at their upper and lower ends, respectively, to circular plates 21 and 19 which are provided with suitable holes to accommodate the tubes, as best seen in the diagram in FIG. 2. An electric coil heating element 22 within the concentrator is used as a heat source to boil the brinewater. The boiling brinewater 24 is then passed upwardly through the tubes 20. The brine concentrator operates through the principle of vapor-vacuum compression making use of the fact that when a partial vacuum is pulled on water, it takes less heat to form steam. The vapors 26 forming in the upper chamber 27 of the concentrator from the boiling brine are passed through a conduit 23 to a compressor 28 where the vapors are compressed mechanically, creating a vacuum within the chamber 27. The compressed vapors are passed outwardly from the compressor through a conduit 25 to the concentrator so as to allow condensation in the spaces 29 on the outside of the tubes 20. Fresh water 30 is removed via conduit 31 and, as it is removed, is passed through a heat exchanger 32 in heat exchange with incoming brinewater. Additionally, prior to passing through the heat exchanger, the fresh water may be passed through a filter separator 34 to remove any solid impurities.

The brine concentrator separates the brinewater into two parts. Approximately 75% of the incoming brinewater is discharged as 98% clear, fresh water to a fresh water facility 35. The 2% impurities would consist of dirt or other solid impurities. Fresh water, for purposes of the present invention, means potable water, with not more than 500 parts/million of salt. The remaining 25% of the incoming brinewater is concentrated to 28% salinity. This solution is then released to a concentrated brine storage facility 36 through a conduit 38. It may also be passed through an optional brine filter separator (not shown) prior to being released to storage to remove any foreign solid material such as dirt. It is important to note that this concentrated solution (which will be produced with less than 1% variance) is at an ideal salinity to make the most efficient use of a chemical and/or electrolytic separation process.

The concentrated solution is continuously pumped by a feed pump 40 to a series of electrolytic chlorine cells 42 through a conduit 44. The chlorine cells have a brine inlet 46 that is connected to the conduit. The process of electrolysis is well-known and consists of the decomposition of a chemical compound by an electric current. Electrical energy is supplied as low-voltage direct current to the cells. As is well-known, the higher the salinity of the brine, the greater the conductivity of the brine and the lesser the voltage that is required for electrolysis. In the present invention, the voltage required will be generally steady since the salinity will be fairly close to a constant 28%.

During electrolysis, positively charged ions attracted to the negative electrode or cathode and negatively charged ions are attracted to the positive electrode or anode. The solution is continuously introduced into the anode compartments of the cells where gaseous chlorine ($Cl_2$) is evolved at the electrodes. Metal oxides are liberated at the cathodes. The anode compartment of each cell is kept separated from the cathode compartment so that the various gases and compounds that are evolved do not mix.

The electrolysis produces chlorine ($Cl_2$) as a gas, small amounts of hydrogen gas ($H_2$), a caustic alkali composed mainly of sodium hydroxide (NaOH) and commonly known as caustic soda, and a powdery material composed mainly of calcium (Ca), nitrogen (N) and magnesium oxide (MgO). The caustic alkali is released to a storage facility 48 through a conduit 50.

The inert powder material settles to the bottom of the stack of chlorine cells and may be easily removed through a conduit 51.

Figure 3:
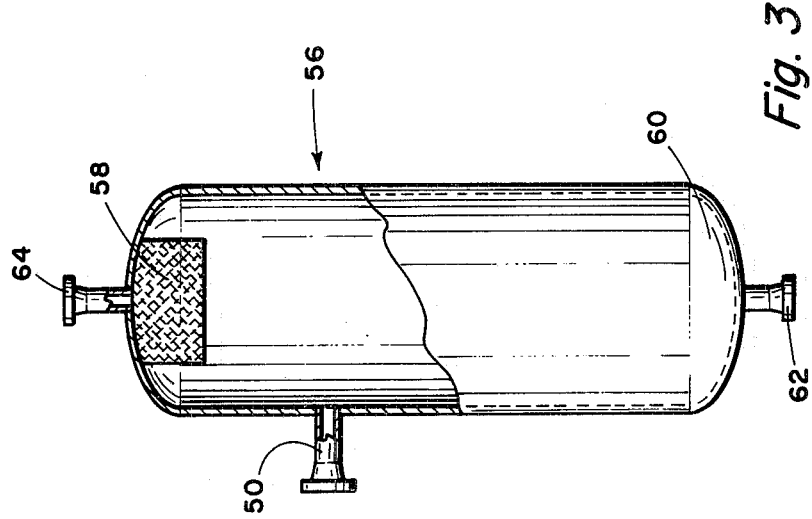
FIG. 3 is a diagrammatic section view of a separator that would be utilized as a part of the desalinization and chemical extraction process shown in FIG. 1.

The gaseous chlorine (not shown in FIG. 1) is pumped from the cells 42 through a conduit 52. Prior to entering a compressor 54, the chlorine is passed through a separator 56 to remove any impurities. The separator, a closed vessel, has a mist extractor that includes a metal mesh screen 58 as best seen in FIG. 3. The gaseous chlorine passes through the screen and any water and liquid drops are trapped thereon. Upon accumulating, the liquid will fall from the screen and gather at the bottom 60 of the separator where it may be removed through a liquid outlet 62 and then passed through a conduit 63. Although not shown, the gas may be passed through the separator an additional time to assure that any liquid impurities are removed.

The pure chlorine gas is pumped from the separator through a vapor outlet 64 to the forward gas compressor 54 where it is changed to liquid chlorine (not shown in FIG. 1). The compressor 54 is a standard mechanical compressor, such as is used in air conditioning units. During compression of the gas, a certain amount of heat is given off which is dissipated by a fan (not shown). The liquid chlorine is finally passed to a chlorine storage tank 66 through a conduit 68.

Similarly, the gaseous hydrogen produced during electrolysis is pumped through a conduit 69 to a separator 70, similar to the chlorine separator 56, where impurities are removed. The hydrogen is carried through a conduit 71 and under some circumstances may be compressed down to liquid form in a gas compressor 72 and finally pumped to a hydrogen storage tank 74 through a conduit 76.

The use of the products of the present invention is multiple. Chlorine gas, as a chloride compound, is the main raw element in plastics. Chlorine gas is also used in treating drinking water for human consumption and in the manufacture of cleaning products.

The caustic alkali or caustic soda contains approximately 50% sodium hydroxide (NaOH). Among commercial uses of the alkali is as an acid neutralizer and as a food preservative. The alkali may also be treated to produce pure sodium hydroxide (NaOH).

After completion of the process, it can be seen that no unusable brinewater solution is left to be dealt with.

Other and further objects and advantageous features will hereinafter appear in connection with the following description.

EXAMPLE

A barrel of brinewater is equal to approximately 159 liters of brine-water. The concentrator has an outside diameter of 1.3 meters and a height of 2 meters. A quantity of 300 barrels of brine introduced to the concentrator will yield 225 barrels of fresh water and 75 barrels of concentrated brine.

The 75 barrels of concentrated solution are then passed through the chlorine cells, which have a capacity of approximately 2700 kg. The cell stack has outside dimensions approximately 1.4 meters high, 1.7 meters long and 1 meter wide. With the brine salinity at approximately 28%, the cell efficiency is at its peak; however, assuming, for the sake of the present example, eighty percent efficiency, the resulting products are 6375 kg of chlorine gas, and 5010 kg of caustic alkali, and a small amount of hydrogen gas.

Whereas the present invention has been described in particular relation to the drawings attached hereto, it should be understood that other and further modifications of the invention, apart from those shown or suggested herein, may be made within the spirit and scope of this invention.

What is claimed is:

1. A combined desalinization and chemical extraction process for brinewater having a salinity of 7½% to 9% which method comprises introducing said brinewater into a concentrator of the type having closed upper and lower chambers interconnected by a plurality of parallel spaced vertical tubes surrounded by a closed shell extending between said chambers; heating said brinewater within said concentrator until the brinewater reaches its boiling temperature; withdrawing vapors from said upper chamber and separately compressing said vapors so as to create a partial vacuum within said upper chamber; introducing the compressed vapors into the concentrator in the spaces between said tubes and said shell so as to allow condensation in said spaces; removing condensed fresh water from said spaces between said tubes; removing brinewater concentrated to 28% salinity from said lower chamber; conducting said concentrated brinewater to a plurality of electrolytic cells having positively charged anodes and negatively charged cathodes; electrolyzing with low-voltage direct current said concentrated brinewater within said cells to release chlorine gas, caustic alkali containing primarily sodium hydroxide, a small amount of hydrogen gas and an inert material containing calcium and magnesium oxides; conducting said caustic alkali from said electrolytic cells; conducting said inert material from said electrolytic cells; conducting said chlorine gas from said electrolytic cells to a mist extractor separator to remove any impurities; compressing said pure chlorine gas to form liquid chlorine; and removing said hydrogen gas from said electrolytic cells.

2. A combined desalinization and chemical extraction process as set forth in claim 1 including the additional step of passing said condensed fresh water in heat exchange with brinewater prior to entering said concentrator.

3. A combined desalinization and chemical extraction process as set forth in claim 1 including the additional step of passing the condensed fresh water through a filter separator to remove any foreign material such as dirt.

* * * * *